United States Patent [19]

Brooks et al.

[11] Patent Number: 5,842,014
[45] Date of Patent: Nov. 24, 1998

[54] SYSTEM AND METHOD FOR DISTRIBUTING PROCESSING AMONG ONE OR MORE PROCESSORS

[75] Inventors: Evan Brooks; Thomas J. Padula, both of Palo Alto; Robert E. Currie, San Francisco; Peter A. Richert, San Jose, all of Calif.

[73] Assignee: Digidesign, Inc., Menlo Park, Calif.

[21] Appl. No.: 553,139

[22] Filed: Nov. 7, 1995

Related U.S. Application Data

[63] Continuation of Ser. No. 490,459, Jun. 14, 1995, abandoned.

[51] Int. Cl.[6] .................................. G06F 9/46; G06F 9/44
[52] U.S. Cl. .................... 395/673; 395/495; 364/DIG. 1; 364/DIG. 2
[58] Field of Search ...................... 395/800, 712, 395/673, 685, 672, 208, 676, 614, 670, 502, 379, 677, 674, 500, 411.685, 555, 902, 421.11, 489, 495; 370/261, 263, 270, 268, 425, 267, 222; 379/204, 158, 206, 202; 84/602, 477 R, 478, 645; 364/DIG. 1, DIG. 2

[56] References Cited

U.S. PATENT DOCUMENTS

| | | | |
|---|---|---|---|
| 4,224,688 | 9/1980 | Ciancibello et al. | 370/263 |
| 4,271,502 | 6/1981 | Goutmann et al. | 370/261 |
| 4,412,281 | 10/1983 | Works | 395/182.02 |
| 4,575,845 | 3/1986 | Baranyai et al. | 370/263 |
| 4,646,288 | 2/1987 | Shumway | 370/267 |
| 4,797,877 | 1/1989 | Pope et al. | 370/458 |
| 5,027,347 | 6/1991 | Malkki | 370/270 |
| 5,331,111 | 7/1994 | O'Connell | 84/602 |
| 5,349,656 | 9/1994 | Kaneko et al. | 395/672 |
| 5,357,511 | 10/1994 | DiNapoli et al. | 379/206 |
| 5,577,250 | 11/1996 | Anderson et al. | 395/670 |

OTHER PUBLICATIONS

An Audio Engineering Society Preprint, Presented at the 78th Convention 1895 May 3–6 Anaheim, "The Digital Audio Processing Station: A New Concept in Audio Post–Production", James A. Moorer et al., 2242 (D–4).

An Audio Engineering Society Preprint, Presented at the 89th Convention 1990 Sep. 21–25, Los Angeles, "Optimizing Massive Parallel Architectures for Real–Time Digital Audio", Ken N. Linton et al., Preprint #2972, Session–Paper #F–II–6.

An Audio Engineering Society Preprint, Presented at the 91st Convention 1991 Oct. 4–8 New York, "An Introduction to Stream Computer Architecture", Gary W. Schwede, 3189 (M–6) 7M/M–6.

An Audio Engineering Society Preprint, Presented at the 95th Convention 1993 Oct. 7–10 New York, "An Object Oriented System for Digital Audio Workstation DSP Development", Theodore C. Tanner, Jr. et al., 3754 (B3–PM–1).

An Audio Engineering Society Preprint, Presented at the 83rd Convention 1987 Oct. 16–19 New York, "A Magnetic Storage Disk–Based Digital Audio Recording, Editing, and Processing System", Charles L. Bagnaschi, 2505 (H–3).

Principles of Digital Audio, Second Edition, Eighth Printing—1994, Ken C. Pohlmann, pp. 424–427, 464.

*Primary Examiner*—Daniel H. Pan
*Attorney, Agent, or Firm*—Mintz, Levin, Cohn, Ferris, Glovsky and Popeo, P.C.

[57] ABSTRACT

A computer system for performing distributed processing, particularly of digital audio data, is disclosed. The system has a number of digital signal processors linked to a host computer through a time division multiplex bus. The system includes means for assigning to a particular processor a specific processing task or tasks, as well as a means for assigning additional specific processing tasks to that same processor to maximize its use. When the processor performing a specific processing task has reached its capacity, the system assigns a new processor to perform that task. To enhance the efficiency of the processor to perform the specific processing task, the processor cyclically runs a specific set of instructions for performing that specific processing task, and waits for the system to send it digital data to be processed.

9 Claims, 5 Drawing Sheets

EXAMPLE SET OF PLUG-INS, PLUG-IN ALGORITHMS, AND DSP RESOURCES

| PLUG-IN NAME | ALGORITHM | % DSP RESOURCES |
|---|---|---|
| A | EQ1 | 60 |
| | EQ2 | 20 |
| | EQ3 | 25 |
| B | COMPRESSOR | 20 |
| | GATE | 20 |
| | EXPANDER | 20 |
| C | REVERB | 100 |

Fig. 3

SYSTEM AND METHOD FOR DISTRIBUTING PROCESSING AMONG ONE OR MORE PROCESSORS

This application is a continuation of Ser. No. 08/490,459 filed Jun. 14, 1995 now abandoned.

BACKGROUND OF THE INVENTION

The present invention relates to a system and a method for efficiently distributing processing tasks among a plurality of digital signal processors (DSPs).

DESCRIPTION OF PRIOR ART

Digital audio workstations (DAWs) are gaining popularity in the recording studio and post-production environments. The concept of having a complete studio on the desktop is rapidly becoming a reality within professional audio. Digital audio workstations are used to mix, amplify, control and otherwise affect either the audio portion of a multimedia event or a production which is solely audio, such as a song or composition. Two important features desirable in any DAW are the DAW's ability to perform audio "tasks" (such as equalization, reverberation, etc.) in a real-time, efficient manner and the ability of the DAW to handle a number of tasks simultaneously or nearly simultaneously. Anything slower than real-time is unacceptable, and anything faster results in there being more capacity per unit time on the processor for it to perform other tasks (if the system can take advantage of it). Furthermore, it is a desirable feature of a DAW that its design and operation be flexible enough so that the digital signal processors (DSPs) which are called upon to perform the selected tasks are programmed to be used in the most efficient and effective manner to achieve the desired result, the production of an audio production or soundtrack.

The flexibility of the DAW can be measured by its editing capability and the number of channels and the amount of digital signal processing (DSP power) the system can operate with. In the past, a difficult task in the development of a DSP-based DAW has been architecting the distribution of the DAW's processing tasks across the available processing resources. On the one hand, a system can be designed such that a DSP or a number of DSPs (usually external) can be dedicated to performing a single, possibly selectable algorithm, such as an equalization or a reverberation performed on some audio data. Thus, any equalization or reverberation task on a piece of audio data input into the DAW must be efficiently sent by the user's host computer to the dedicated DSP, the task performed and the result of the task returned to the host computer or forwarded to another task (or to a storage or memory device if no further tasks are required). This type of dedicated processor system has the advantage of allowing a DSP or set of DSPs to perform the same function over and over again efficiently because there is no "overhead" for multitasking, but results at times in DSPs being idle because their particular specialization may not be requested at any given time while other DSPs may become overloaded because the compute power of the remaining DSPs may not be sufficient to efficiently process a particular task. While this type of dedicated processor system may be more efficient, it is not very flexible, in that one algorithm cannot use more DSP processing power than is available in its box. Also, the user cannot add more algorithm types and the signal processors are not embedded in the DAW itself.

On the other end of the spectrum is a system in which none of the DSPs are specialized but in a random, general purpose DSP "pool" in which any DSP can perform any number of different tasks. An example of this type of system is the Apple ARTA explained below, in which each DSP and the host processor implement a multitasking operating system. While these are flexible (any DSP can run a part of any algorithm), they are not very efficient because task switching takes DSP overhead, both cycles and memory resources, and the DSP algorithm must be written to coexist with all the other DSP code which runs within the DSP. Thus, in this type of system, each DSP in the pool performs multiple algorithms simultaneously by using a real-time multitasking operating system. While this arrangement has the advantage that it can run multiple independent processes independently, the overhead required causes the DSPs to be used inefficiently. Thus, one disadvantage of such a system is that, while DSPs can be configured to perform any task, the system is inefficient in using DSP resources because of multitasking requirements.

Thus, it would be most desirable to formulate a DAW in which the processing of different tasks can be most effectively distributed among a plurality of DSPs. One solution is to distribute the task or tasks required to be performed among a plurality of DSPs so that each of the DSPs becomes "specialized" and will do, over and over again, most efficiently what it is programmed to perform, yet the system is flexible enough to allow reallocation of tasks to DSPs depending upon their availability and suitability for a particular task to be performed.

However, a central problem in such distributed (or parallel) processing is how to divide the tasks such that they may be executed on the available computing hardware. Distributed and parallel processing techniques are well known in computer programming, especially in the area of supercomputing, where parallel processing is used to achieve extremely high levels of computing performance. Programming of algorithms on such a computer is tedious and complex, however.

Prior to the present invention, a solution was needed to solve the task division problem, but one that is well suited to the types of parallel and distributed processing found in DAWs (although it may have application in other areas as well).

Before audio was stored and manipulated digitally, parallel and distributed processing was accomplished by analog mixing consoles and racks of outboard signal processing equipment. Parallel processing was realized by having a mixing console with a large number of identical processing sections. This redundancy was effective, but inefficient, as not all signals required the same processing elements. Distributed processing was accomplished by patching in external signal processing equipment to the mixing console. If two reverberation processors were needed, two were fetched and attached via cables to the mixing console. Each signal processing task was "distributed" to a particular piece of hardware equipment, one task per piece of equipment. One disadvantage of such a system is that each piece of equipment could only perform one function, so it is necessary to have a great deal of external equipment available at any given time.

With the advent of digital signal processors, the external processors could now be a programmable device, such as an Alesis Quadraverb, available from Alesis Corporation, the SPX-90, available from Yamaha Corporation, etc. Such devices could perform many different types of signal processing, but only one type at a time. While not completely general purpose, they did reduce the number of different external processors needed. Later processors, such as the H-4000, available from Eventide Corporation, allowed the user to perform any two of its possible functions at one time, rather than just one, enhancing its usefulness a little further. However, all of these processors are inherently limited by the amount of compute power that is contained within them, typically one or two general purpose DSP chips. Multiple units cannot be "ganged" together if an algorithm needed more compute power. Nor can their compute power be used by any other device in the system that may need more processing power than it currently possesses.

The inflexibility of such systems is further evidenced by the fact that users must be content with the processing algorithms supplied by the processor manufacturer, and cannot use algorithms from other sources, nor develop any of their own. In such systems, the distribution of processing is performed at the highest level —typically by the end-user, who decides which processors are performing which functions and how they are connected to the rest of the system.

While the above prior art approaches focused on a single task per processor, other prior art solutions were directed at the opposite end of the spectrum —allowing a large number of tasks to be executed simultaneously on a single processor. A good example of this is Apple Computer's Apple Real Time Architecture (ARTA) system. ARTA is a software architecture designed by Apple Computer of Cupertino, Calif. that lets the user run a software module that allocates, implements and controls signal processing algorithms on a DSP chip. However, the DSP code must be written in a very specific manner so that it operates concurrently with the DSP code from other modules and DSP code from the "operating system" that manages the concurrent processing of the software modules. The advantage of such a system is that it is flexible enough to implement unrelated processes on the same DSP chip. However, given a set of algorithms to run at one time, that flexibility forces the DSP chip to be used less efficiently than would be desirable.

ARTA was written to allow Apple computers that had a general purpose DSP on the motherboard, such as the Quadra 840av and the Quadra 660av models, to perform a variety of functions at the same time, thus validating the DSP's usefulness in the system. It was expected that the DSP could perform audio input and output, speech recognition and synthesis, fax and modem services, and other audio and telephony functions required by the computer. To perform these functions, a large and complex software system called ARTA was developed. ARTA consisted of code that ran on the host CPU to manage the loading and distribution of DSP software tasks, and a realtime operating system that ran on the DSP itself that provided low-level services to the DSP code and implemented effective time-sliced multitasking. The DSP would execute many separate tasks at once by performing a small bit of one task, and then interrupting that to perform a small bit of the next task, and so on.

While the ARTA system did allow the DSP to perform multiple tasks simultaneously, it had several major drawbacks. First, the "overhead" system code that performs the task switching and loading consumed a large percentage of the DSP's available processing power. The DSP had no private external memory, and so it was made more inefficient by sharing its memory with the host processor. And finally, the DSP code must be written in a very specific manner so that it operates concurrently with DSP code from other modules and DSP code from the "operating system" that manages the concurrent processing of the software modules. In such systems, the distribution of processing is handled at the lowest level of the system. The ARTA operating system code determines which processes should be run on the DSP, and the DSP's operating system determines how to share its time amongst them.

Thus, while the prior art systems attempted to solve the problems of distributing the "workload" or allowed a DSP to perform a plurality of tasks, the prior art systems all were required to compromise efficiency, presenting a less than ideal solution to the problem.

SUMMARY OF THE INVENTION

The purpose of the present invention is to allocate, control, and implement a set of signal processing algorithms in a distributed processing system in a way that is both efficient and flexible. It is efficient in that, given a distributed processing system, a significant and useful amount of signal processing can be implemented by utilizing a maximal amount of DSP processing. It is flexible in that many types of signal processing algorithms can be implemented simultaneously.

While this invention is applicable to signal processing in general, the preferred embodiment in this description will refer to the signal processing of digital audio signals, and more specifically, real-time processing of such signals. However, it is to be understood that neither the audio nor real-time nature of the signals is a requirement of this system.

The present invention is disclosed as a system for distributing a plurality of processing tasks amongst one or more general purpose DSPs or other suitable processors well known to those skilled in the art. The distribution of tasks is performed by an intermediate level software object or any other suitable programming techniques know to those skilled in the art. The software object (to be called a "plug-in") is designed to allocate resources across an entire DSP chip for a specific, limited set of signal processing algorithms associated with the plug-in. The DSP code running on the DSP chip is dedicated to the plug-in and is written to efficiently implement the set of algorithms associated with the plug-in. As a user of the plug-in requests a specific algorithm that is one of those algorithms amongst its set, the object allocates DSP resources to implement that algorithm in the most efficient way it is able. The function and operation of plug-ins will be described in more detail below.

The software object of the present invention knows how to perform one or more different, independent types of tasks, and must allocate one or more whole DSPs to perform them. As a result, the code that runs on any given DSP is completely optimized for the task, and is therefore extremely efficient. No real-time operating system is required, so all of the DSP's processing power is available for use. In addition, any free DSP can be allocated by any processing object, so it is extremely flexible as well. The flexibility of performing such processing is enhanced by connecting the processors in a time division multiplexed (TDM) bus structure.

Thus, the present invention discloses a system for compensating inefficiencies of prior art systems and allows the distribution of tasks to a one or more DSPs in an efficient and flexible manner.

BRIEF DESCRIPTION OF THE DRAWINGS

FIG. 3 is a diagram which specifies the algorithms available and DSP resources necessary for an algorithm for three example plug-ins (A, B and C).

DESCRIPTION OF THE PREFERRED EMBODIMENT

The preferred embodiment uses a hierarchy of software "objects" to represent the division of labor in the distribution of processing tasks among a plurality of DSPs within the computer system.

Figure 1:
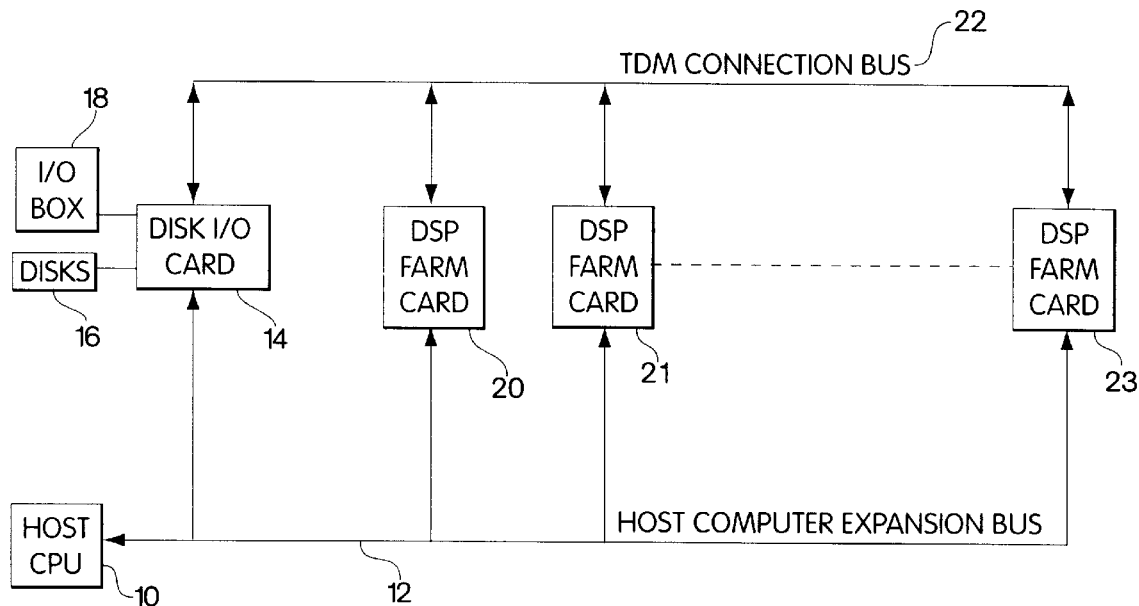
FIG. 1 is a block diagram of a TDM-based computer system in which the invention of the present application may be incorporated.

Thus, essential to the understanding of the present invention is the hierarchy of software objects which represent the division of labor in the present invention's distribution of processing tasks among the plurality of DSPs contained in the computer system, such as that shown in FIG. 1.

FIG. 1 represents in schematic form an embodiment of what is preferably the overall computer system of the present invention. The system includes a host CPU or computer 10, which manages the overall functions of the system. The host CPU system may be a Apple Macintosh personal computer and has a display screen, a central processing unit, dynamic and fixed storage for storing data and instructions, and one or more input devices, such as a keyboard and a mouse. Within the host CPU is a host computer expansion bus 12, which may be, in the case of a Macintosh computer, the Macintosh NuBus backplane of a type well-known in the art. Attached to the expansion bus 12, either interiorally or exteriorally of the computer cabinet, are a number of plug-in cards, such as a disk input/output card 14 which has attached to it one or more disks 16 and an input/output box 18. Also attached to the expansion bus are one or more DSP "Farm" Cards 20, 21 and 23, which contain one or more DSPs that perform the functions to be described below.

Each of the cards described above, as well as other cards, may be connected to one another by a ribbon cable which forms part of a time-division multiplexing bus (TDM bus). The TDM bus system was originally developed at Bell Laboratories in the 1940s for the transmission of many channels of information over telephone lines. In TDM, multiple channels of audio or digital information are transmitted sequentially. The signals to be multiplexed are samples at a uniform rate. This uniform rate is known as a frame rate or system sample rate. Each frame is subdivided in time in to as many "time slots" as there are signals that can be transmitted. At the start of system sample, the first signal is transmitted during the first time slot, then the second signal is transmitted during the second time slot, and so on until all the signals have been transmitted. At the start of the next system sample period, the process starts over with the next set of samples from the signals to be transmitted. TDM is implemented on a set of specialized integrated circuits, available from Digidesign, Inc.

As implemented by the inventors herein, the Digidesign TDM bus architecture developed by the assignee of the present invention was developed as a 24-bit wide, 256-time slot protocol that can route digital/audio from any one source to any number of destinations. The sources and destinations include the inputs and outputs of a hard disk-based digital audio recorder/player, the inputs and outputs of external hardware (digital interfaces and analog convertors), internal audio sources (sample player and synthesizer cards), and DSP processors which run on either algorithm-specific cards or general-purpose DSP cards. In order to transmit 256 digital audio signals in real-time, each audio signal is given a time slot of somewhat less than $\frac{1}{256}$th of a system sample period and is then time-multiplexed. The resulting signal is transmitted via a small ribbon cable, shown as TDM connection bus 22, connecting the various DSP cards together inside the host computer. Each time slot is less than $\frac{1}{256}$ of the system sample period to allow for variable-speed DAW applications. A TDM system is described in U.S. Pat. No. 4,575,845 issued on Mar. 11, 1986 to Baranyai et al. and assigned to AT&T's Bell Laboratories.

The connections of the various DSP cards, signal source cards, and I/0 cards to the TDM bus are performed by a Digidesign-developed ASIC sold with equipment by Digidesign,Inc., the assignee of the present invention. The ASICs are preferably mounted on a card. The overall goal of the object oriented programming in the present invention is to allow DSP software and signal processing devices to easily "plug-in" to the client's application, thus yielding greater functionality and customization of the system for the end-user. An explanation of the various levels of the object will now be given.

Plug-in

This is the highest level of the object. It represents an entity that can perform one or more different types of tasks. A task in this case means a particular signal processing algorithm. In addition, it can perform as many of each of these types of tasks as the available DSP hardware allows. For example, an equalization (EQ) plug-in might be able to perform three different types of EQ algorithms called here A, B and C algorithms. The algorithms may be of a known type or types, being commercially available from various sources, or custom-designed to fit the user's needs. The design of such algorithms does not form part of the present invention. The plug-in could orchestrate or oversee the running of, for example, 12 separate copies of algorithm A, 5 separate copies of algorithm B, and 2 separate copies of algorithm C, all at the same time, assuming there were enough available DSP resources. The numbers 12, 5 and 2 are given for illustration purposes only and those skilled in the art would recognize that other numbers and algorithm types may be utilized with the present invention. Each running "copy" of an algorithm has its own inputs, outputs and operating parameters, and is independent of all other copies of algorithms controlled by the plug-in object.

The types of algorithms a plug-in can perform do not have to be related to each other. A plug-in could perform reverberation and dynamics processing simultaneously, just as the plug-in discussed above can perform three different types of EQ algorithms simultaneously.

The plug-in is responsible for allocating and freeing DSP resources, loading code into them, and determining how many of each type of algorithm it controls can run on each DSP. Essentially, the plug-in handles the distribution of processing in the system, but only for the types of algorithms it controls.

Figure 2:
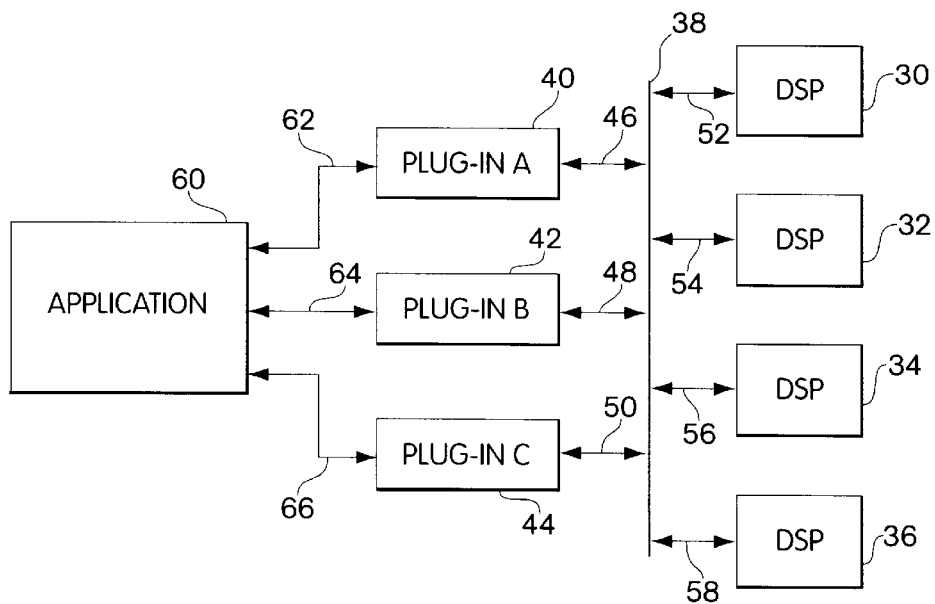
FIG. 2 illustrates the integration of plug-ins into the computer system of FIG. 1.

Turning to FIG. 2, FIG. 2 illustrates the overall architecture of a plug-in. The general functioning and operation of plug-ins is of an object-oriented system that is described in "An Object-Oriented System For Digital/Audio Workstation DSP Development", a paper presented at the 95th Convention of the Audio Engineering Society (AES), Oct. 7–10, 1993, by Theodore Z. Tanner, Jr. and Thomas J. Padula, the text of which is incorporated herein by reference.

FIG. 2 illustrates a system that can implement multiple independent digital signal processing algorithms by using plug-ins. Each of the DSP chips 30, 32, 34 and 36 are illustrated as being connected to TDM bus 38 through suitable connections 52, 54, 56 and 58. In addition, three plug-in modules 40, 42 and 44 are also shown being connected to TDM bus 38 through connections 46, 48 and 50. In addition, an application 60 running on the computer system may cause the computer system to perform a number of tasks on an audio sample to be transferred across the TDM bus. The application is shown as being connected to each of the three plug-ins through connections 62, 64 and 66. The application software may be the software a user interacts with to dynamically configure the DSPs according to his or her needs. The application 60 has access, using techniques well known to those skilled in the art and as described in the above-referenced AES paper, to plug-ins 40, 42 and 44, each of which can implement the same or differing set of algorithms. Each of the plug-ins can also communicate with each of the DSPs 30, 32, 34 and 36 in order to cause one or more of the DSPs to implement its particular algorithms.

Thus, plug-ins may be seen as pieces of stand-alone code and they were developed in C++ for the benefits that an object-oriented programming language has to offer and because it is well established within the Apple Macintosh environment. DSP plug-ins allow such things as application to plug-in communication, hardware allocation and basic user interface capabilities once as object calls. Therefore, this capability can be reused by each plug-in.

Thus, the above object is accomplished by architecting a software object (plug-in) that allocates resources across an entire DSP chip for a specific, limited set of signal processing algorithms associated with that plug-in. The DSP code running on the DSP chip is dedicated to the plug-in to efficiently implement the set of algorithms associated with the plug-in. As a user of the plug-in requests a specific algorithm that is one among those in its set, the object allocates DSP resources to permit the algorithm to execute in the most efficient way it can.

Algorithm

This object represents a particular type of algorithm that can be executed by a plug-in object. A plug-in object has references to one algorithm object per type of algorithm it supports. In the above example, the EQ plug-in would have references to 3 different algorithm objects. The algorithm object knows the specific type of algorithm it supports, and the types of control parameters and user,interaction that are required to support that type of algorithm.

Instance

This object represents an individual instanciation of a particular algorithm on a DSP. Every time a plug-in object asks an algorithm object to run one more of its algorithms on a DSP, an instance object is created to manage the actual running of the DSP code that performs this instance of the algorithm. In the above example, once again for purposes of illustration, the algorithm object for Algorithm A would refer to 12 instance objects, the algorithm object for Algorithm B would refer to 5 instance objects, and the algorithm object for Algorithm C would refer to 2 instance objects. Each instance refers to a particular signal processor that the user has created. Every time the user wants to put another EQ algorithm in his signal path, a new instance object for that EQ algorithm is created.

Flow Chart

Figure 8:
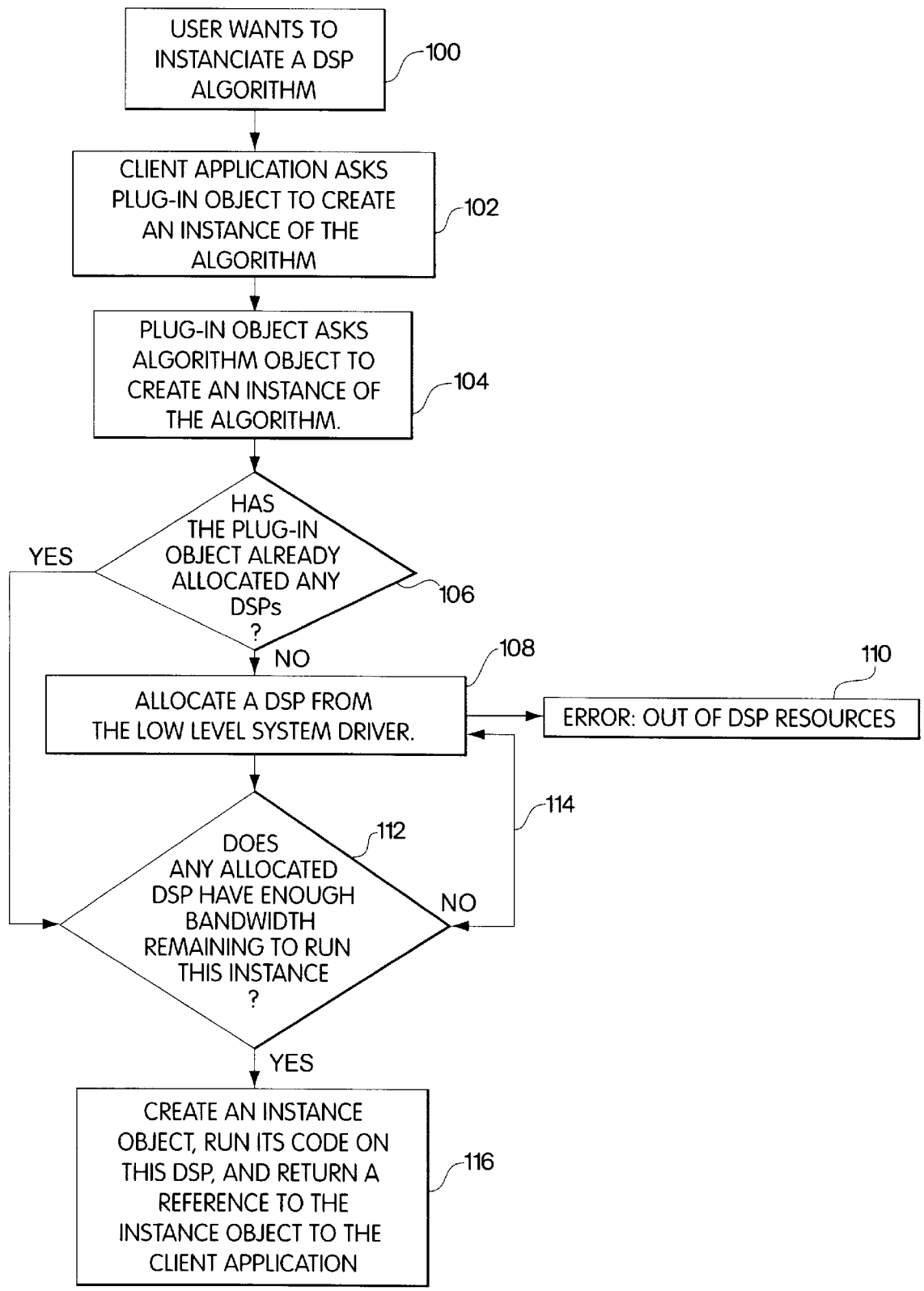
FIG. 8 is a flow chart illustrating the operation of the plug-in of the present invention.

The following discussion and FIG. 8 of the drawings describe how the system functions by detailing the system's response to a user's request for signal processing of a given set of digital, preferably audio, data. In step 100, the user decides that a particular type of signal processing function is needed at a certain point within the system. For example, a guitar part might require a particular type of EQ algorithm to make it sound better. The user, through manipulation of the user interface, for example a software application described and illustrated in the AES article referred to above, is presented with a list of the available types of algorithm in the system. This list is compiled by the system asking each plug-in object to list the different types of algorithm objects it supports. In the next step, step 102, the application asks the plug-in object to create an instance of the algorithm desired to be applied, such as the EQ algorithm discussed above. The user chooses one of the available algorithm types, and the system sends a message to the plug-in object that handles that algorithm type. In step 104, the plug-in object requires the algorithm object to create an instance of the algorithm. The message states, effectively, "make me one instanciation of this type of algorithm, put it on a DSP, and return a reference to it back to me so that the client application can then hook its inputs and outputs up to the rest of the system".

The plug-in object first looks to see if it has already allocated any DSPs in step 106. If not, it allocates one, in step 108, by asking a low-level system driver to allocate any free DSP to it, and to mark that DSP as allocated within the driver, so that no other software can allocate or use that DSP until the plug-in frees it first. If the driver indicates that there are no free DSPs available, the plug-in object, in step 110, returns an error back to the application that called it, indicating that there is insufficient hardware to create the requested process. The application software would then inform the user through the user interface. If, as a result of the query in step 112, the allocated DSP does not have enough bandwidth remaining to run this instance, another DSP is allocated in step 114. If that DSP then has enough bandwidth to run this instance in step 112, then in step 116 an instance object is created. At step 106, if there are DSPs available, the step 107 process proceeds directly to step 112 because a DSP is not required to be allocated in step 108.

If the plug-in has already allocated one or more DSPs, or if a DSP has not been already allocated but is allocated in step 108, the plug-in then examines the DSPs it has allocated or the newly allocated DSP(s) and tries to determine in step 112 if any one of them (which may be then occupied with one or more instances) has sufficient bandwidth or capacity available to run one more of the requested instances. If the answer is yes, in step 116 an instance object is created, its code runs on the DSP and a reference to the instance object is returned to the running application program.

To understand how the plug-in does this, it is helpful to understand how the DSP code's functionality might be divided. Turning to FIG. 3, this figure illustrates an example of a set of plug-ins, plug-in algorithms and DSP resources. Plug-ins A, B and C in FIG. 3 correspond to the exemplary plug-ins 40, 42 and 44 shown in FIG. 2. Any number of plug-ins may be utilized to perform any number of tasks or algorithms. While the user may be unable to determine what percentage of the DSP's resources are used in performing a particular task, the user merely keeps asking for more and more instances. At some point in time, if all DSPs are fully occupied, the system will so inform the user. The user interface may also inform the user as to how many DSPs in the system have currently been allocated to performing one or more tasks. The DSPs which may be utilized in the present invention include 56001 and 56002 model DSPs available from Motorola, Inc.

Figure 4:
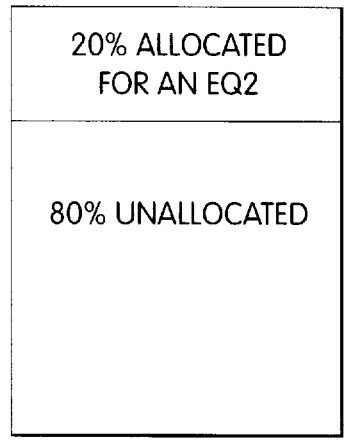
FIG. 4 illustrates a DSP which is dedicated to running codes to implement EQ1, EQ2 and EQ3 algorithms and currently allocated 20% of an EQ2 algorithm.
Figure 5:
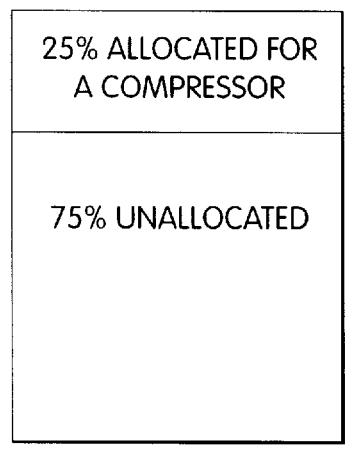
FIG. 5 illustrates a DSP dedicated to running the code to implement the compressor, gate and expander algorithms and is allocated 25% to implementing only the compressor algorithm.

Table 78, shown in FIG. 3, shows three columns 80, 82 and 84 referring to the identity of the plug-in module, the particular algorithm(s) that plug-in module can handle, and the percentage of DSP resources that one instance of that particular algorithm is required. Thus, turning to plug-in 40, that plug-in has the capacity of applying three algorithms: EQ1, EQ2 and EQ3, which may be algorithms well known to those skilled in the art. The next column 84 indicates that an EQ1 algorithm, in this example, will consume 60% of the resources of a DSP whereas an EQ2 algorithm will consume 20% and an EQ3 will consume 25%. Similar provisions exist for the compressor gate, expander and reverb algorithms which are governed by plug-ins 42 and 44. It should be appreciated that the percent of DSP resources consumed is determined experimentally and programmed into the portion of the plug-in software for a particular EQ or other algorithm. It can be appreciated from FIG. 3 that a single DSP cannot simultaneously perform an EQ1, EQ2 and EQ3 tasks, since such tasks would consume more than 100% of the capacity of the DSP. Turning now to FIGS. 4–7, these figures illustrate in an exemplary manner the activity of DSPs 30, 32, 34 and 36 in the example shown in examples 4, 5, 6 and 7. In FIG. 4, the DSP 30 has been, in accordance with the table of FIG. 3, been allocated to the task of performing an EQ2 instance of an algorithm. Thus, FIG. 4 shows that DSP is 20% allocated for an EQ2 instance and has a remaining 80% which is unallocated which may be taken up with other algorithms that are known to the particular plug-in that has allocated that DSP. Similarly, as shown in FIG. 5, DSP 2 is shown as having allocated 25% of capacity for a compressor instances leaving 75% unallocated which may be used for other algorithms that are known to the particular plug-in that has allocated that DSP.

Figure 6:
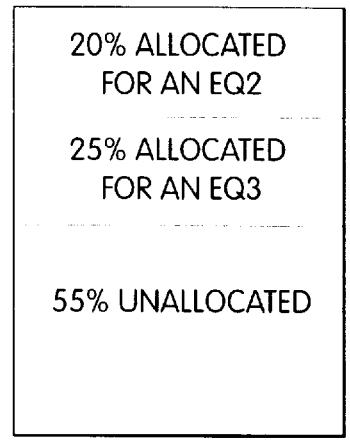
FIG. 6 illustrates DSP1 allocated by 25% more to implement an EQ3 concurrently with an EQ2 algorithm with 55% unallocated.

The manner in which a software plug-in operates is best described by an example. Assume that no DSP resources have been currently allocated to any plug-in and the system has just begun to function to perform one or more tasks. In the example, let us suppose that the application requests plug-in 40 to perform an EQ2 algorithm. Plug-in A then allocates the first free DSP it can find that occupies a DSP farm (and thus is attached to the TDM bus) and determines that DSP 1 is available and able to implement EQ2 algorithms as well as other DSP codes designed specifically to implement EQ1 and EQ3 algorithms. It then allocates (in the example of FIG. 4) 20% of DSP 30's resources to implement an EQ. In the next step, let us suppose that the application requests the plug-in to implement an compression algorithm. The plug-in then asks the algorithm object to create an instance which reserves processing time on a particular DSP, such as DSP 32, and creates an instance object to manage it. If DSP 32 is available, it is directed to run DSP code designed specifically to implement the compressor as well as the gate and expander algorithms concurrently. It then allocates 25% (in the example of FIG. 5) of DSP 32's resources to implement a compressor, leaving 75% of DSP resources unallocated. Then, further let us suppose that the application requests plug-in 40 to implement an EQ3 algorithm. As shown in FIG. 6, plug-in 42 knows that it has control of DSP 30 and knows that it can implement an EQ2 algorithm on DSP 30 concurrently with the EQ2 algorithm currently being implemented on DSP 30 at the direction of plug-in 40. Thus, plug-in 42 will allocate 25% of the DSP resources of DSP 30 to perform an EQ3 algorithm and implements it.

Next, let us suppose that application requests plug-in 40 to implement an EQ1 algorithm. Plug-in 40 knows that it has control of DSP 30 but knows that since an EQ1 requires 60% of DSP's resources, DSP 30 will not be able to implement an EQ1 at this point.

Figure 7:
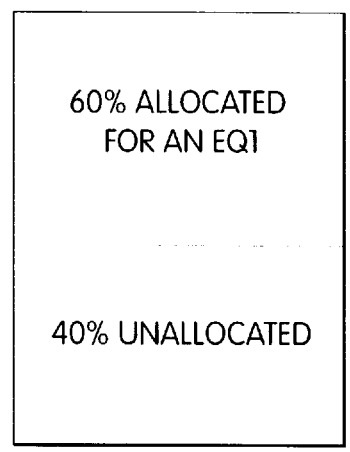
FIG. 7 illustrates DSP3 allocated by 60% to implement an EQ1 algorithm with 40% unallocated.

The system of the present invention is prioritized to direct a task to an DSP already occupied and performing a given algorithm so that each DSP is fully occupied before another DSP is allocated to make most efficient use of DSP resources. However, in this case, DSP 30 will be overloaded and not able to perform the EQ1 while it is implementing the other tasks. Thus, plug-in 40 polls the other DSPs attached to the TDM bus and determines, for illustrative purposes, that DSP 34 is available, as illustrated in FIG. 7. Since DSPs are in a very real sense generic and will run whatever code for any task they are instructed to, plug-in 40 loads into DSP 34 code which is designed implement to EQ1, EQ2 and EQ3 algorithms simultaneously. It then allocates 60% of DSP 34's resources to implement an EQ1 task. As the application requests a plug-in to remove an algorithm, it will deallocate DSP resources used to implement the algorithm so that the DSP is freed up to perform other tasks. The plug-in which is to implement a particular application will always look to determine whether any DSP it has already allocated has capacity to perform the algorithm the plug-in desires to have implemented before proceeding to a "new" DSP which is currently not utilized.

In the simplest case, for a plug-in that only knows how to perform a single type of algorithm, the DSP code it loads will just perform N of those processes in a big loop, where N is the number of those processes it can perform within the amount of time it has to compute its output. For example, if a DSP can execute 400 instructions per sample period, and one instance of the particular EQ algorithm supported by the plug-in takes 10 instructions, the DSP code will execute 40 independent copies of that EQ algorithm. Each copy will not have its inputs and outputs connected up to the rest of the system until it is actually "instanciated", but it is always there running. DSP code written this way is extremely compact, fast and efficient. As more of those EQs are instanciated, the DSP's usage efficiency rises closer to 100%. Then the plug-in will have to allocate another DSP to handle up to the next 40 instanciations.

In a more complex case, it will be assumed that a plug-in can perform several different types of algorithms. The DSP code might perform algorithm A in a loop X times, followed by algorithm B in a loop Y times, followed by algorithm C in a loop Z times. X, Y and Z represent the number of instanciations of each one of those processes that exists at that time.

The plug-in knows how many instructions each of the three algorithms takes (the algorithm object can provide this information), so as long as the total number of instructions required to execute all the instances of all the algorithms it runs is less than 400, as in the above example, they will all fit onto that one DSP. Requests for any more algorithms will require another DSP to be allocated. Thus, as can be seen, the system of the present invention, while retaining a variety of DSPs as relatively generic can allows them to become highly specialized to run specialized code to increase efficiency, that is, specialized to run one or more particular types of algorithms, such as EQ1, EQ2 and EQ3, while at the same time using general purpose DSPs, possessing TDM connectivity and adaptable resource allocation/deallocation for a high degree of flexibility as well.

By having a particular DSP already running in an endless loop be caused to perform such a task, a number of repeated tasks makes more efficient use of DSP. The time a particular task takes to perform is reduced, since the DSP is only performing the algorithm, waiting only for the particular digital data to be made available to the DSP. Efficiency is achieved for several reasons: (1) the DSPs have hardware looping support that allows zero overhead for looping, so loops are very efficient; (2) data structures and access to them is very regular and thus register addressing modes can be configured a single time, rather than once for each instance of an algorithm; (3) the DSP code only needs to be loaded into the DSP once and is never swapped in and out (as it is in Apple's ARTA system) to execute different algorithms; and (4) data structures are allocated ahead of time and, therefore, never have to compete with each other for space. This avoids data swapping a run-time and makes maximally efficient use of the DSP's limited memory resources.

The system of the present invention is more efficient than a system in which a DSP is always dedicated to performing one type of algorithm since that algorithm may not be needed at a particular time and DSP resources will be wasted. It is also more efficient than a system in which a DSP may be able to multi-task and execute a number of different functions at one time. Such system pays a high efficiency price by having to switch between all the different functions it executes. Thus, the system is inefficient since even though it can run in real-time, the DSPs themselves are run inefficiently, since task switching takes up valuable DSP overhead, both cycles and memory resources. Thus, an additional benefit of the present system is that a DSP which has become "specialized" to perform, for example, EQ1 and EQ3 algorithms will automatically have allocated to it such instances so long as it has the capacity for all such instances. It can perform those calculations more efficiently than a DSP which has not been allocated to any particular specialization. By having each of the DSPs connected directly or indirectly to the TDM bus, audio data may be quickly sent to and received from a DSP thus making the overall operation and efficiency of processing of algorithms more efficient than would have been the case in prior art systems.

To those skilled in the art to which this invention relates, many changes in construction and widely differing embodiments and applications of the invention will suggest themselves without the departing from the spirit and scope of the invention. The disclosures and the description herein are purely illustrative and are not intended to be in any sense limiting.

What is claimed is:

1. A computer system for performing distributed processing functions, the computer system including a host computer, the host computer having a display means, a central processing means, a storage means, an instruction and data set input means, and a bus system operatively associated with the host computer, the bus system being associated with a plurality of processors and operatively connecting the plurality of processors, the improvement comprising:

means associated with the host computer for receiving a request from the input means for processing instructions for a selected data set function;

means associated with the host computer for identifying which of the plurality of processors is preferentially suited to performing the processing of instructions for the selected data set function;

means for selecting at least one of the processors which is suited for processing the instructions;

means for sending the instructions to the selected at least one processor;

means in the processor to process the instructions and send the result of the processing the instructions to a destination chosen by the host computer: and means for preferentially selecting at least one of the processors for performing the processing of instructions for a selected data set, wherein the means for selecting is determined by the particular set of instructions the selected processor is already executing;

wherein at least a second one of the plurality of processors is executing a second particular set of instructions, further comprising means within the computer system for preferentially selecting and sending to the second processor a selected data set for processing using the second particular set of instructions.

2. The computer system of claim 1 further comprising means within the computer system to determine which of the plurality of processors is capable of performing a particular set of instructions, the means for determining causing the computer system to send a particular selected data set to a particular one of the plurality of processors.

3. The computer system of claim 2 wherein at least one of the processors is suitable for performing additionally the processing of at least a second set of instructions for a selected data set, and whereby the means for selecting may select the processor for either or both of a first and second set of instructions for processing.

4. A computer system for performing distributed processing functions, the computer system including a host computer, the host computer having a display means, a central processing means, a storage means, an instruction and data set input means, and a bus system operatively associated with the host computer, the bus system being associated with a plurality of processors and operatively connecting the plurality of processors, the improvement comprising:

means associated with the host computer for receiving a request from the input means for processing instructions for a selected data set function;

means associated with the host computer for identifying which of the plurality of processors is preferentially suited to performing the processing of instructions for the selected data set function;

means for selecting at least one of the processors which is suited for processing the instructions;

means for sending the instructions to the selected at least one processor;

means in the processor to process the instructions and send the result of the processing of the instructions to a destination chosen by the host computer; and means for preferentially selecting at least one of the processors for performing the processing of instructions for a selected data set, wherein the means for selecting is determined by the particular set of instructions the selected processor is already executing;

wherein the processor has a predetermined processing capacity, and further comprising means for determining whether a selected processor can process a given set of instructions for a selected data set, such that if the selected processor is so capable, the selected processor will perform the set of instructions, and if the selected processor is not so capable, means within the computer system to send the given set of instructions to another of the plurality of processors.

5. The computer system of claim 4 further comprising means for determining the capacity of each of the plurality of processors for a particular set of instructions, and means for sending selected data streams to be processed by a selected processor to maximize usage of that processor's processing capacity.

6. In a computer system including a host computer, the host computer having a display means, a central processing means, a storage means, an instruction and data set input means, and a bus system operatively associated with the host computer, the bus system being associated with a plurality of processors and operatively connecting the plurality of processors, a method of performing distributed processing comprising the steps of:

receiving a request from the input means for processing instructions for a selected data set function;

identifying which of the plurality of processors is preferentially suited to performing the processing of instructions for the selected data set function;

selecting at least one of the processors which is suited for processing the instructions:

sending the instructions to the selected at least one processor;

processing the instructions within the processor and sending the result of the processing the instructions to a destination chosen by the host computer;

keeping track as to which of the plurality of processors is capable of performing a particular set of instructions;

sending a selected data set calling for the particular set of instructions to the capable processor; and sending additional selected data sets calling for the particular set of instructions to the same capable processor.

7. The method of performing distributed processing of claim 6, further comprising the step of sending additional selected data sets calling for the particular set of instructions to the same capable processor until that processor's capacity has been reached, and then sending the additional selected data sets to another of the plurality of processors for processing.

8. In a programmed computer system, a method for processing at least one algorithm on a plurality of digital signal processors (DSPs) through a programmed plug-in object, comprising the steps of:

selecting an algorithm for at least one of the DSPs to process;

creating an instance of the selected algorithm through the plug-in object;

determining whether the plug-in object has already allocated at least one of the DSPs;

if the determining step is affirmative, ascertaining whether the allocated DSP has sufficient capacity to process the instance; and if the ascertaining step is affirmative creating an instance object, running its algorithm on the DSP, and then returning a reference to the instance object to the programmed computer system;

if the determining step is negative, attempting to allocate at least one of the plurality of DSPs from the programmed computer system to perform processing of at least one algorithm;

if the allocation is successful, ascertaining whether the allocated DSP has sufficient capacity to process the instance; and, if the ascertaining step is affirmative, creating an instance object, running its algorithm on the DSP, and then returning a reference to the instance object to the programmed computer system.

9. The method of claim 8, wherein:

if the step of attempting to allocate indicates that none of the DSPs are available, returning an indication to the programmed computer system that there are no available DSPs to process the at least one algorithm.

\* \* \* \* \*